United States Patent [19]

Kawasaki

[11] 3,776,185
[45] Dec. 4, 1973

[54] CREAM FEEDER FOR APPARATUS FOR PRODUCING CONFECTIONERY

[75] Inventor: Kaoru Kawasaki, Sakai, Japan

[73] Assignee: Tenchi Kikai Kabushiki Kaisha, Sakai, Osaka Prefecture, Japan

[22] Filed: July 3, 1972

[21] Appl. No.: 268,895

[52] U.S. Cl. .................. 118/406, 101/35, 101/119
[51] Int. Cl. .............................................. B05c 3/00
[58] Field of Search ...................... 118/406, 14, 24, 118/25, 411, 213, 259, 236; 425/114; 99/450.6, 450.7; 101/35, 119

[56] References Cited
UNITED STATES PATENTS

| | | | |
|---|---|---|---|
| 1,164,944 | 12/1915 | Legler | 118/25 |
| 2,333,382 | 11/1943 | Kent | 101/115 |
| 2,796,847 | 6/1957 | Guggenheim | 118/411 |
| 2,597,893 | 5/1952 | Nordquist | 118/406 UX |
| 2,736,290 | 2/1956 | Scholl | 118/213 X |

FOREIGN PATENTS OR APPLICATIONS

| | | | |
|---|---|---|---|
| 363,246 | 4/1906 | France | 118/25 |

Primary Examiner—Morris Kaplan
Attorney—John C. Holman et al.

[57] ABSTRACT

An apparatus comprises a conveyor for transporting confectionery pieces in an equidistant arrangement along a guide path, a rotary cylinder rotatable at a circumferential speed equal to the travelling speed of the confectionery pieces so as to come into contact with the travelling confectionery pieces at a predetermined position and formed with a number of apertures spaced apart by a distance equal to the space between the travelling confectionery pieces, and a cream feeder disposed within the cylinder and having outlets for supplying cream onto confectionery pieces through the apertures which cream is forced into the feeder, whereby the area over which the cream is deposited on the confectionery pieces and the amount of the cream are controlled.

3 Claims, 3 Drawing Figures

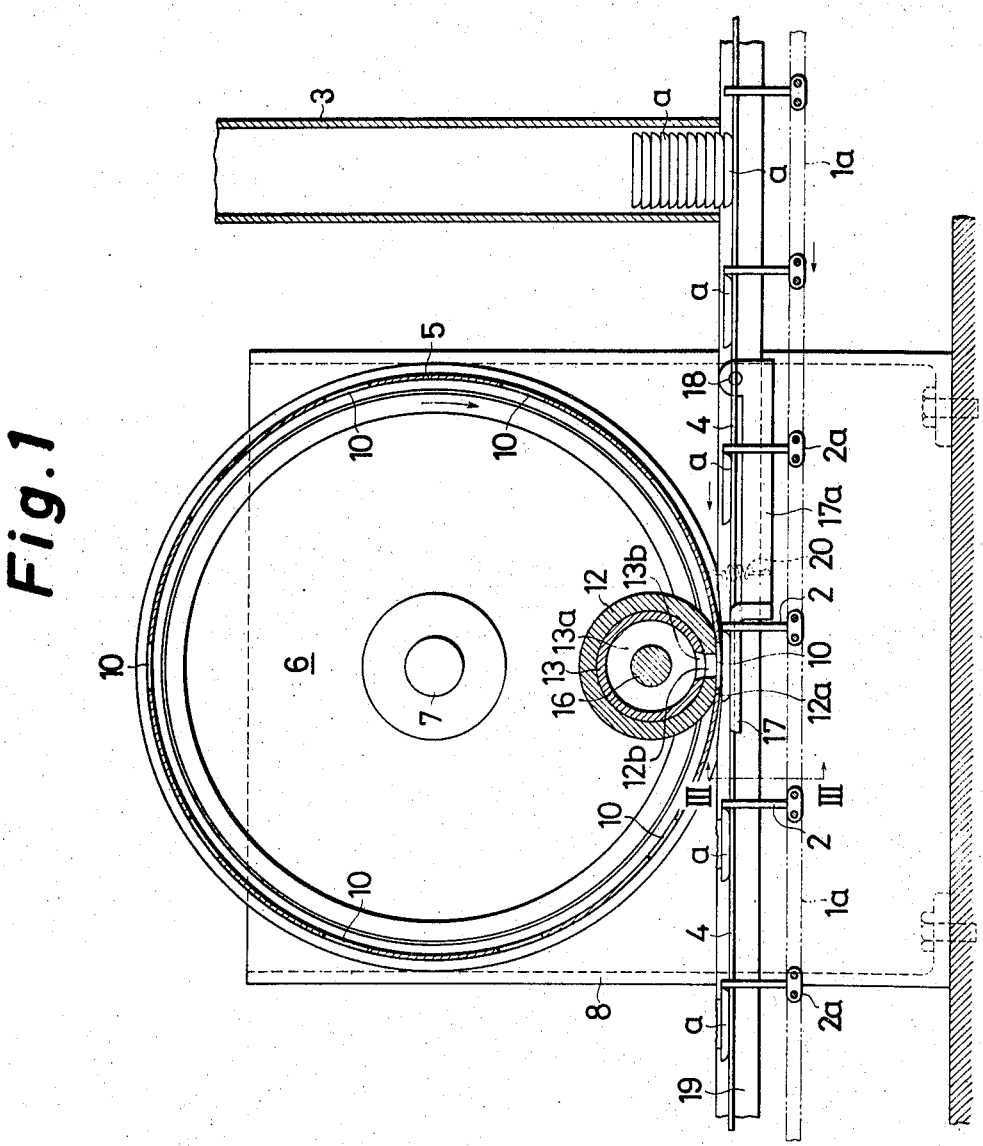

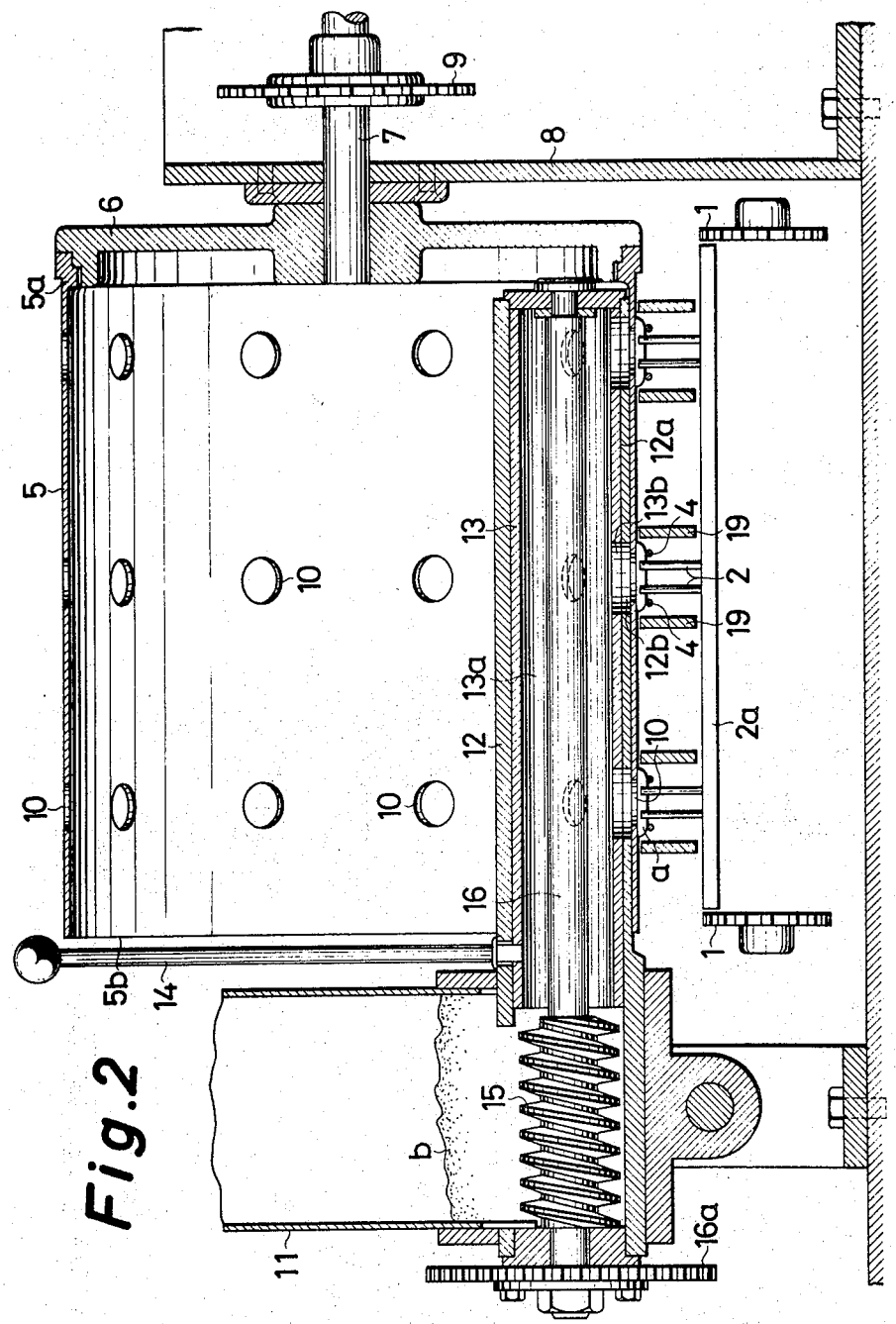

CREAM FEEDER FOR APPARATUS FOR PRODUCING CONFECTIONERY

BACKGROUND OF THE INVENTION

The present invention relates to an apparatus for producing confectionery such as a cream biscuit which is composed of two confectionery pieces and a layer of cream sandwiched therebetween, more particularly an apparatus for placing a predetermined amount of cream on one of the confectionery pieces.

Generally, a cream biscuit or cream-sandwiched biscuit which is made up of two biscuit pieces and a layer of cream sandwiched therebetween is produced by placing cream on one biscuit piece, then placing the other biscuit piece over the cream and fitting them together. An apparatus for depositing cream on one confectionery piece serving as a base of such composite biscuit is already known which comprises a conveyor belt for transporting confectionery pieces, an endless metal belt formed with apertures and adapted to be driven at the same speed as the confectionery pieces with its apertures positioned on the confectionery pieces in registry therewith, and a cream feeder disposed above the apertures so as to supply cream onto the confectionery pieces through the apertures.

With the conventional apparatus of such type, however, it has been impossible to achieve improved operation efficiency, because the endless metal belt, if driven at a high speed, will vibrate up and down to result in the possibility of the confectionery piece breaking.

SUMMARY OF THE INVENTION

An object of this invention is to provide an apparatus for producing confectionery such as described above by which a predetermined amount of cream can be deposited at a high speed onto confectionery pieces serving as a base, without any possible breakage of the confectionery pieces during operation, the apparatus thus being capable of achieving high efficiency.

Another object of this invention is to provide an apparatus of the type described which is extremely simple in construction.

In order to fulfil the foregoing objects, the apparatus of this invention is characterized by a construction comprising guide means for slidably carrying confectionery pieces thereon and defining the path of advance thereof, means for conveying the confectionery pieces on the guide means at a predetermined speed in an equidistant arrangement, a rotary cylinder so disposed as to permit its peripheral surface to come into contact at a given position with the confectionery pieces on the guide means and rotatable at a circumferential speed equal to the travelling speed of the confectionery pieces, the rotary cylinder being formed in its peripheral surface with a number of apertures spaced apart by a distance equal to the space between the travelling confectionery pieces for controlling the area over which the cream is to be deposited on the confectionery pieces and the amount thereof, and a cream feeder having cream outlets in sliding contact with the inner peripheral face of the rotary cylinder and having a smaller width than the apertures in the circumferential direction of the cylinder, whereby cream forced into the feeder by forcibly supplying means is deposited onto the confectionery pieces through the cream outlets and the apertures.

When a confectionery piece sent forward by the conveying means reaches the position beneath the rotary cylinder, the aperture of the cylinder is positioned on the confectionery piece in registry therewith, whereupon the cream feeder supplies a predetermined amount of cream onto the confectionery piece through the aperture.

When the aperture has passed the under face of the cream outlet, the inner peripheral face of the rotary cylinder closes the outlet. The amount of cream supply is controlled by the size of the aperture and the thickness of the cylinder wall in which the aperture is formed.

The aperture which is formed in the peripheral face of the rotary cylinder may include clearances relative to the confectionery piece, at its opposite edges with respect to the circumferential direction of the cylinder, but since the cream outlet has a smaller width than the aperture in the circumferential direction of the cylinder, there is no possibility of the cream leaking from the clearances during the cream depositing operation.

Because the apertured member of this invention is in the form of a rotary cylinder, it is free from any vibration even when driven at a high speed and the confectionery pieces are ensured against breakage due to vibration, with the result that the confectionery pieces can be transported and the rotary cylinder can be driven at much higher speeds than conventionally possible, hence greatly improved operation efficiency.

Furthermore, the rotary cylinder according to this invention is supported and driven by an extremely simplified structure, which consequently serves to simplify the apparatus in its entirety.

Other objects and features of this invention will become more apparent from the following description of an embodiment.

BRIEF DESCRIPTION OF THE DRAWINGS

FIG. 1 is a view in vertical section taken along the advancing direction of confectionery pieces and showing the principal part of embodiment of this invention;

FIG. 2 is a view in section showing the same and taken at a right angle to the advancing direction of confectionery pieces; and FIG. 3 is a fragmentary enlarged view in section taken along the line III-III in FIG. 1.

DESCRIPTION OF THE PREFERRED EMBODIMENT

Referring to the drawings, endless chains 1a are driven by sprocket wheels 1 in the direction of an arrow in FIG. 1. Pusher rods 2, fixed by bars 2a to the endless chains 1a in an equidistant arrangement, push confectionery pieces a onto guide means 4 one after another from the lowermost position of a stocker 3 in which the confectionery pieces a are piled up. The confectionery pieces a are sent toward the terminal end of the guide means 4 by the pusher rods 2. The guide means 4 comprises wires extending from one end of the guide path up to the other end thereof as shown, or may comprise a suitable striplike plate member. The endless chains 1a are positioned below the guide means 4, and the pusher rods 2 fixed to the chains 1a extend upward beyond the guide means 4. Although the illustrated embodiment includes three guide means 4 arranged in parallel as shown in FIG. 2, the number of the guide means 4 is not particularly limited.

A rotary cylinder 5 positioned above the guide means 4 has a peripheral face adapted to come into contact, at a predetermined position, with the upper faces of the confectionery pieces a transported on the guide means 4. The rotary cylinder 5 has its one end 5a secured to a closure end plate 6 integrally therewith and is rotatably supported by a shaft 7 on a bearing 8. A sprocket wheel 9 is fixedly mounted on the shaft 7 so as to drive the rotary cylinder 5 by an unillustrated drive shaft through a chain (not shown). Thus, the cylinder is rotatable in one direction at a circumferential speed equal to the travelling speed of the confectionery pieces a.

The peripheral wall of the rotary cylinder 5 to be brought into contact with the upper faces of the travelling confectionery pieces a is formed with a number of apertures 10 spaced apart by a distance equal to the space between the travelling confectionery pieces a. The aperture controls the amount of cream b to be placed on the confectionery piece a and the area over which the cream is deposited on the confectionery piece a.

Beside an opening 5b of the rotary cylinder 5 at the other end thereof, there is provided a cream stocker 11, from the lower end of which extends a cream feeder tube 12 into the rotary cylinder 5. The under face of the feeder tube 12 has a slidable face 12a so shaped as to be in conformity with the inner face of the cylinder 5. The face 12a is slidably in fitting contact with the inner face of the cylinder 5.

The cream feeder tube 12 is formed, in the slidable face 12a, with cream outlets 12b having a smaller width than the apertures 10 in the circumferential direction of the cylinder 5, each of the outlets 12b being in alignment with a group of circumferentially arranged apertures 10, the arrangement being such that the cream outlet 12b will face, through the aperture 10, the upper face of the confectionery piece a passing thereunder.

An adjusting tube 13 for adjusting the extent of opening of the cream outlets 12b is rotatably fitted in the cream feeder tube 12 to provide a double tube construction. The adjusting tube 13 has an inner space 13a communicating with the cream stocker 11 and is formed in its peripheral wall with adjusting holes 13b to be registered with the cream outlets 12b. Rotation of the tube 13 by a handle 14 causes the adjusting holes 13b to overlap the cream outlets 12b to varying extents, whereby the area over which cream is deposited through the outlets 12b on the confectionery pieces a is varied, this serving to control the cream supply onto the confectionery pieces a.

A screw conveyor 15 forces the cream b from the cream stocker 11 toward the cream outlets 12b through the inner space 13a of adjusting tube 13 in the cream feeder tube 12. A gear 16a on one end of rotary shaft 16 of the screw conveyor 15 is driven by an unillustrated drive gear meshing therewith to force the cream b into the inner space 13a.

Indicated at 17 are arms for pushing the confectionery piece a against the face of the rotary cylinder 5 when the piece a passes beneath the cylinder 5 while travelling on the guide means 4, each of the arms 17 being pivoted at its base portion 17a to a fixed guide 19 by a pin 18. The arm 17 adjustably pushes the confectionery piece a under the action of a spring 20 acting thereon. Thus, the arms 17 resiliently push the confectionery piece a against the peripheral face of the cylinder 5 to compensate for variation in the thickness of the confectionery piece a and thereby keep the fitting contact to a constant extent all the time between the peripheral edge of the aperture and the confectionery piece a.

Simultaneous operation of the endless chains 1a, rotary cylinder 5 and screw conveyor 15 causes the confectionery pieces a to reach the position beneath the cylinder to effect contact between the peripheral edges of the dpertures 10 and the upper faces of the confectionery pieces a, whereupon cream is supplied through the cream outlets 12b.

Due to the rotation of the rotary cylinder 5, the apertures 10 pass under the cream outlets 12b at the same speed as the confectionery pieces a, permitting the outlets 12b to open for the confectionery pieces a only while the apertures 10 are passing beneath the outlets 12b. In other words, while the apertures are not so positioned, namely while the confectionery pieces a are out of contact with the under face of the cylinder 5, the outlets 12b are kept closed by the inner face of the rotary cylinder 5.

As a reslut, when the confectionery pieces a come into contact with the peripheral face of the rotary cylinder 5, a predetermined amount of cream is supplied onto the confectionery pieces, over an area limited by the apertures.

What is claimed is:

1. A cream feeder for an apparatus for producing confectionery comprising:
   guide means for slidably carrying confectionery pieces thereon and defining the path of advance thereof,
   means for conveying the confectionery pieces on the guide means at a predetermined speed in an equidistant arrangement,
   a rotary cylinder so disposed as to permit its peripheral surface to come into contact at a given position with confectionery pieces travelling on the guide means and rotatable at a circumferential speed equal to the travelling speed of the confectionery pieces, the rotary cylinder being formed in its peripheral surface with a number of apertures spaced apart by a distance equal to the space between the travelling confectionery pieces for controlling the area over which the cream is to be deposited on the confectionery pieces and the amount thereof,
   cream feeder means having cream outlets in sliding contact with the inner peripheral face of the rotary cylinder for placing cream onto the confectionery pieces through the cream outlets and the apertures which cream is forced into the feeder means by forcibly supplying means, and
   said cream feed means comprising a cream feeder tube having the cream outlets slidably in fitting contact with the inner face of the rotary cylinder, and an adjusting tube fitted in the feeder tube and having adjusting holes to be registered with cream outlets, the adjusting tube being rotatable to control the extent of opening of the cream outlets.

2. The cream feeder as set forth in claim 1 wherein the cream outlets have a smaller width than the apertures of the rotary cylinder in the circumferential direction of the cylinder.

3. The cream feeder as set forth in claim 1 further including pusher means for resiliently pushing the confectionery pieces travelling on the guide means against the apertures of the rotary cylinder, the pusher means comprising arms each pivoted at its base portion to a fixed guide of the guide means and springs urging the arms toward the pushing direction, the arms extending into the path of advance of the confectionery pieces.

* * * * *